United States Patent [19]

Marshall et al.

[11] Patent Number: 4,946,926
[45] Date of Patent: Aug. 7, 1990

[54] MELT PROCESSABLE THERMOTROPIC AROMATIC COPOLYESTERS

[75] Inventors: William B. Marshall; James L. Brewbaker, both of Midland, Mich.

[73] Assignee: The Dow Chemical Company, Midland, Mich.

[21] Appl. No.: 348,316

[22] Filed: May 4, 1989

[51] Int. Cl.$^5$ ............................................ C08G 63/02
[52] U.S. Cl. ...................................... 528/193; 528/176
[58] Field of Search ................................ 528/176, 193

[56] References Cited

U.S. PATENT DOCUMENTS

| | | | |
|---|---|---|---|
| 3,637,595 | 5/1969 | Cottis et al. | 528/176 |
| 3,975,487 | 8/1976 | Cottis et al. | 528/176 |
| 3,991,014 | 11/1976 | Kleinschuster | 528/193 |
| 4,067,852 | 1/1978 | Calundann | 528/298 |
| 4,118,372 | 10/1978 | Schaefgen | 528/190 |

OTHER PUBLICATIONS

Chemical Abstracts: vol. 109: 110995e, "Fully Aromatic Poly(ether-Esters)," De Abajo, J.

Primary Examiner—Harold D. Anderson
Assistant Examiner—T. Mosley

[57] ABSTRACT

The invention relates to a class of copolyesters which display optical anisotropy in the molten state and to the shaped articles, fibers and films obtained from the optically anisotropic melts. The copolyesters comprise recurring structural units (a) independently each occurrence selected from the group consisting of Formulas I and II; recurring structural units (b) independently each occurrence selected from the group consisting of Formulas III and V; recurring structural units (c) independently each occurrence selected from the group consisting of Formula IV; and optionally recurring structural units (d) independently each occurrence selected from the group consisting of Formula VI:

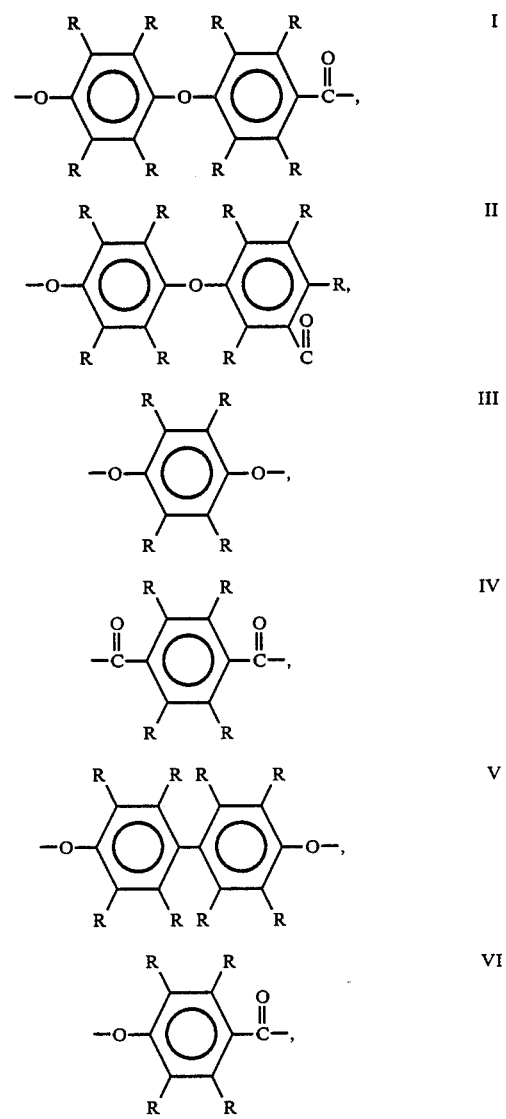

wherein R independently each occurrence is a chemically inert substituent.

12 Claims, No Drawings

MELT PROCESSABLE THERMOTROPIC AROMATIC COPOLYESTERS

FIELD OF THE INVENTION

The invention relates to a class of copolyesters which display optical anisotropy in the molten state and to the shaped articles, fibers and films obtained from the optically anisotropic melts.

BACKGROUND OF THE INVENTION

Liquid crystalline polymers (LCPs) are macromolecules possessing significant orientation in either the molten state or in solution. The state of their solution (lyotropic) or melt (thermotropic) is between the boundaries of solid crystals and isotropic liquids. In the solid state these highly ordered polymers display exceptional strength properties in the direction of orientation. By designing molecules containing only relatively inert chemical bonds, preparation of thermally and oxidatively stable high-performance materials is possible.

A review of thermotropic LCPs can be found in Kwolek et al., "Liquid Crystalline Polymers", *"Encyclopedia of Polymer Science and Engineering"* 2nd Ed, Vol. 9, pp 23-55 (1987). Among those listed are polyesters. Many liquid crystalline polyesters display several of the desirable attributes of these compounds. Unfortunately, most have too high of a melt temperature for economical melt fabrication.

There is a growing need in the thermoplastic engineering industries to provide for new and improved polyesters and copolyesters which possess a high degree of processability while concurrently exhibiting superior mechanical properties.

SUMMARY OF THE INVENTION

The invention concerns copolymers capable of forming an optically anisotropic melt comprising recurring structural units (a) independently selected from the group consisting of Formulas I, II, and mixtures thereof; recurring structural units (b) independently selected from the group consisting of Formulas III, IV, and mixtures thereof; recurring structural units (c) independently selected from the group consisting of Formula IV; and optionally recurring structural units (d) independently selected from the group consisting of Formula VI:

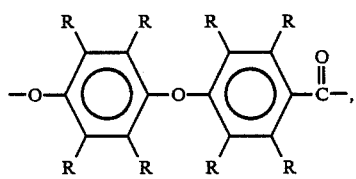

I

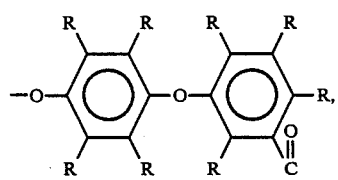

II

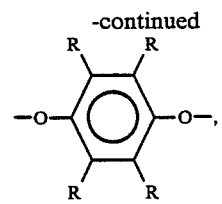

III

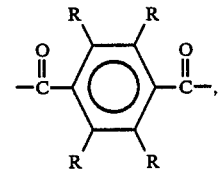

IV

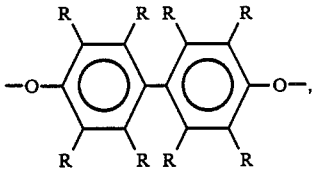

V

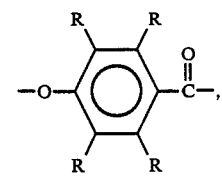

VI wherein each R independently is a chemically inert substituent.

DETAILED DESCRIPTION

A preferred copolymer of the invention comprises the recurring structural unit of Formula I, III, IV and VI. Another preferred copolymer comprises the recurring structural units of Formulas I, III and IV.

Preferably, R is independently selected from the group consisting of hydrogen, halo, lower alkyl, methoxy and phenyl. Most preferably, R is each occurrence hydrogen.

Preferably, the copolymers of the invention comprise from 10 to 75 mole percent of the independently occurring structural units of Formulas I and II, from 2 to 40 mole percent of the independently occurring structural units of Formulas III, IV and V, and from 0 to 80 mole percent of the recurring structural unit of Formula VI. More preferably, the mole percentages are from 15 to 50, from 5 to 35 and from 15 to 70, respectively. Most preferably, the mole percentages are from 15 to 35, from 10 to 25 and from 35 to 65, respectively. The ratio of the sum of the mole percent of the structural units of Formulas III and V to the mole percent of the structural units of Formula IV should equal one.

The copolymers may be formed by a variety of ester-forming techniques from difunctional organic compounds possessing functional groups which upon polycondensation form the requisite recurring units. For example, the functional groups of the organic aromatic compounds may independently contain carboxylic acid groups or acid halide groups and functional groups reactive therewith such as hydroxy or acyloxy groups. In a preferred embodiment, the organic reactants comprise lower acyloxy and carboxylic acid functionality. For example, lower acyl esters of 4-(4'-hydroxyphenoxy)benzoic acid, 3-(4'-hydroxyphenoxy)benzoic acid and 4-hydroxybenzoic acid wherein the hydroxy group is esterified are more preferred as reactants. The lower acyl groups preferably have from 2 to 4 carbon atoms. Most preferably, the acetate esters are useful.

The organic compounds may be allowed to react under anhydrous conditions in an inert atmosphere via a melt acidolysis procedure, in a suitable solvent via a solution procedure, or in a heat exchange medium via a slurry polymerization as described in Calundann, U.S. Pat. No. 4,067,852. Additional suitable reaction conditions are described in Schaefgen, U.S. Pat. No. 4,118,372. The teachings of the foregoing U.S. Patents are incorporated herein by reference. A preferable technique is the melt acidolysis technique.

A catalyst may or may not be used in the polymerization process. If used, representative catalysts for use in the process include dialkyl tin oxide (e.g., dibutyl tin oxide), diaryl tin oxide, titanium dioxide, alkoxy titanium silicates, titanium alkoxides, Lewis acids, hydrogen halides (e.g., HCl), alkali and alkaline earth metal salts of carboxylic acids (e.g., sodium acetate). The quantity of catalyst utilized typically is from 0.001 to 1 weight percent based upon total reactant weight, and most commonly from 0.01 to 0.2 weight percent. In a preferred embodiment, no catalyst is used in the preparation thereof.

The melts of the copolyesters have low viscosity and unusual interactions with light and electrical fields. Melts of the copolyesters of the present invention can be processed by thermoplastic shaping such as injection molding or extrusion to produce articles. Articles comprise mouldings, boards, sheets, fibers and films which have desirable mechanical properties such as high tensile strength and high impact resistance. These articles also exhibit high resistance to solvents and chemicals. The articles are useful, for example, in the aircraft and aerospace industries, for military applications, in telecommunications systems and for high performance electrical components.

Conventional additives and processing aids can be added to the copolyester melts of the invention. Examples of additives are oxidation stabilizers; heat stabilizers; ultraviolet light (UV) stabilizers; lubricants; mold release agents; dyes and pigments; fibrous or powdered fillers and reinforcing agents; nucleating agents; and plasticizers.

Examples of oxidation stabilizers and heat stabilizers are halides of metals of group I of the Periodic Table, used alone and used as a mixture with copper (I) halides or sterically hindered phenols in concentrations from 0.001 to 1 weight percent based on the weight of the copolyester composition.

Examples of UV stabilizers are substituted resorcinols, salicylates, benzotriazoles, benzophenones and mixtures of these, which are added, for example, in amounts from 0.001 to 2 weight percent based on the weight of the copolyester composition.

Dyes and pigments are used, for example, in amounts from 0.001 to 5 weight percent based on the weight of the copolyester composition. Examples are nigrosine, titanium dioxide, cadmium sulfide, phthalocyanine dyes, ultramarine blue and carbon black.

Examples of fillers and reinforcing agents are carbon fibers, glass fibers, amorphous silica, calcium silicate, aluminum silicate, magnesium carbonate, kaolin, chalk, powdered quartz, mica and feldspar, which may be present in a concentration from 0.5 to 70 weight percent, based on the total weight of the filled material.

Examples of nucleating agents are talc, calcium fluoride, sodium phenylphosphonate, alumina and finely divided polytetrafluoroethylene. Suitably, the nucleating agent may be present in an amount from 0.001 to 1 percent by weight.

For example, from 0.0001 to 20 weight percent, based on the weight of the composition can be plasticizers, such as phthalates, hydrocarbon oils and sulfonamides.

Also included in the composition of the invention, in addition to or in partial replacement of the reactants of Formulas I, II, III, IV, V or VI are small amounts of other aromatic polymerizable units whose presence do not interfere with the excellent mechanical properties of these copolyesters. Examples of such aromatic units comprising these additional repeating units are isophthalic acid, resorcinol, 4,4'-isopropylidenediphenol and 3-hydroxybenzoic acid.

Preparation of 3-(4'-Acetoxyphenoxy)benzoic Acid

Ethyl 3-hydroxybenzoate (34.0 grams (g), 0.205 mole) (Aldrich Chemical Company, Milwaukee, Wis.), 4-bromoanisole (26.0 milliliters (ml)), (38.8 g, 0.208 mole) (Aldrich Chemical Company), anhydrous potassium carbonate (17.8 g, 0.129 mole) and copper powder (10.0 g, 0.157 mole), (Fisher Scientific, Pittsburgh, Pa.) were heated under nitrogen to 190° C. with slow stirring. Water generated during the reaction was removed by means of a short-path distillation apparatus attached to the reaction flask. After 20 hours, the reaction mixture was allowed to cool and 20 percent aqueous sodium hydroxide (NaOH) (50 ml) was added. Ester hydrolysis was complete after 1 hour at reflux. The cooled reaction mixture was acidified with concentrated hydrogen chloride (HCl), partitioned between methylene chloride ($CH_2Cl_2$ (300 ml)) and water (50 ml), and filtered to remove copper powder. The phases were separated and the organic layer was washed with saturated sodium chloride (NaCl) ($2 \times 100$ ml), dried with magnesium sulfate ($MgSO_4$), filtered, and solvent evaporated to afford a light brown solid. The crude product was recrystallized from 60 percent aqueous acetic acid to afford 3-(4'-methoxyphenoxy)benzoic acid as off-white crystals (40.77 g, 0.167 mol) with a melting point (m.p.) of 120° C. to 125° C.

An amount of 3-(4'-methoxyphenoxy)benzoic acid (40.7 g, 0.167 mole) was dissolved in 200 ml of acetic acid to which 150 ml of a 48 percent solution of hydrogen bromide (HBr) was added (Aldrich Chemical Company). The reaction mixture was heated to reflux under nitrogen for 14.5 hours. The cooled reaction mixture was then diluted with 400 ml of ethyl acetate (EtOAc), washed with saturated NaCl ($3 \times 150$ ml), dried with $MgSO_4$, filtered, and solvent evaporated to afford a dark brown solid. The crude product was dissolved in methanol, treated with activated carbon, filtered through a celite pad, and evaporated. Recrystallization of the product (1:1 acetic acid/water) gave 3-(4'-hydroxyphenoxy)benzoic acid as tan crystals with a m.p. of 163° C. to 166° C.

An amount of 3-(4'-hydroxyphenoxy)benzoic acid (9.772 g, 42.45 millimoles (mmoles)) was dissolved in 6 M NaOH (18 ml, 108 mmoles) and cooled in an ice bath. Acetic anhydride (8.0 ml, 11.1 g, 109 mmoles) was added cautiously to the basic solution at such a rate as to maintain 0° to 5° C. and then stirred vigorously for an additional 15 minutes (min) at 0° C. The reaction mixture was then allowed to warm to room temperature over 1 hour. The aqueous solution was acidified with 6 M HCl (18 ml, 108 mmoles) and extracted with 75 ml of ethyl acetate. The organic solution was washed three times with a 50 ml saturated solution of NaCl, dried with MgSO$_4$, filtered, and solvent evaporated. The crude product was taken up in methanol, treated with activated carbon, filtered through a celite pad, and evaporated. Recrystallization of the product gave 9.83 g of 3-(4'-acetoxyphenoxy)benzoic acid as an off-white powder with a m.p. 141° C. to 143° C.

Preparation of 4-(4'-Acetoxyphenoxy)benzoic Acid

A mixture of (136 g, 1.10 moles) of 4-hydroxyanisole and (65 g, 1.00 mole) of potassium hydroxide was heated at 120° C. to 130° C. until a hazy solution was formed. A vacuum was applied and the temperature was slowly increased to 170° C. over a 1 hour period. The reaction mass was cooled to room temperature and 200 ml of dimethylsulfoxide was added. The mixture was heated to 120° C. to 130° C. under nitrogen to dissolve the solid. Over a 45 minute period a solution of 4-chlorobenzonitrile (137 g, 1.0 mole) in 250 ml of dimethylsulfoxide was slowly added. The temperature was held at 120° C. to 130° C. for an additional two hours. The reaction mass was cooled to room temperature and was diluted with 200 ml of 1.1 N aqueous potassium hydroxide solution. An off-white solid separated and was collected and washed for 1 hour with 2 L of water and dried in a vacuum oven at 75° C. for 5 hours. There remained 4-(4'-methoxyphenoxy)benzonitrile with a m.p. of 106° C. to 109° C.

A solution of 4-(4'-methoxyphenoxy)benzonitrile (101.2 g, 0.45 mole) in 750 ml of hot acetic acid was slowly diluted with 500 ml of 48 percent aqueous hydrobromic acid. This solution was refluxed for 25 hours, then cooled. A light brown solid separated. The solid was collected, stirred in 800 ml of fresh water, collected again and dried in a vacuum oven at 90° C. for 4 hours. There remained 4-(4'-hydroxyphenoxy)benzoic acid with a m.p. of 191° C. to 193° C. The acid was dissolved in 500 ml of aqueous base, the solution was filtered and the hydroxy acid reprecipitated by acidifying the solution with aqueous hydrochloric acid. The solid was collected and dried in a vacuum oven at 100° C. for 24 hours. There remained a tan solid with a m.p. of 193° C. to 194° C.

The purified hydroxy acid (61.3 g, 0.266 mole) was dissolved in 500 ml of water containing 0.572 mole of sodium hydroxide. The solution was cooled to 9° C. in an ice bath and acetic anhydride (31.1 g, 0.305 mole) was added. In one minute a solid began to precipitate. The slurry was stirred at 0° C. to 9° C. for one hour then it was acidified with concentrated HCl. The light tan solid was isolated by filtration and washed with water, then dried in a vacuum oven for 16 hours at 60° C. There remained 4-(4'-acetoxyphenoxy)benzoic acid with a m.p. of 150° C. to 151° C. The crude acetoxy acid was recrystallized from 700 ml of toluene yielding 60.6 g of purified off-white product with a m.p. of 151.5° C. to 152.5° C.

Preparation of 4-Aoetoxybenzoic Acid

An amount of 4-hydroxybenzoic acid (92.1 g, 0.67 mole) was dissolved in a solution of sodium hydroxide (53.4 g, 1.33 moles) and 1.33 liters (L) of water in a 4 L beaker. The solution was stirred and cooled to a temperature of 0° C., then acetic anhydride (102.1 g, 1.00 mole) was added. The temperature was maintained at −2° C. for 1 hr. A solution of concentrated HCl (144.7 g, 1.42 mole) in 267 ml of water was added. The slurry was stirred briefly and filtered. The product was washed twice by stirring it with 2 L portions of fresh water then filtered and dried in a vacuum oven at 80° C. for 16 hours. After recrystallization from methyl isobutyl ketone, the product consisted of white crystals with a m.p. of 192°–192.5° C.

Preparation of 1,4-Diacetoxybenzene

The reaction was run in a 1-liter, single neck, round bottom flask equipped with a reflux condenser, nitrogen inlet, heating mantle and magnetic stirrer. Hydroquinone (88.0 g, 0.800 mole) and acetic anhydride (706 g., 6.9 moles) were added to the flask. The reaction mixture was heated to reflux at which time all of the hydroquinone had dissolved. The solution was refluxed for 18 hours, then the volatile products were removed to yield 191.2 g of crude 1,4-diacetoxybenzene. The crude product was recrystallized from 600 ml of methyl isobutyl ketone. The hot solution was filtered and allowed to cool overnight in a freezer. The clear, colorless crystals were isolated by filtration and dried in a vacuum oven at 75° C. for 4 hours. There remained 139.8 g of 1,4-diacetoxybenzene with a m.p. of 121.5°–122.0° C.

Preparation of 4,4'-Diacetoxybiphenyl

An amount of 4,4'-biphenol (200 g., 1.07 moles), (Aldrich Chemical Company), and 1000 ml of acetic anhydride were added to a 2-liter boiling flask equipped with a cold water condenser and a polytetrafluoroethylene-coated magnetic stirring bar. The mixture was heated to reflux under nitrogen and all of the solid dissolved. The solution was refluxed for 20 hours and then cooled in a freezer (−15° C.) overnight. The white crystals that were formed were isolated by filtration, washed with cold acetic anhydride and dried in a 100° C. vacuum oven overnight yielding 268.4 g. of 4,4'diacetoxybiphenyl with a m.p. of 162.7 to 164.0° C.

EXAMPLE I

Preparation of a Copolyester from 4-Acetoxybenzoic Acid, Terephthalic Acid, 1,4-Diacetoxybenzene and 4-(4'-Acetoxyphenoxy)benzoic Acid The polymerization was run in a 1 L, single neck, round bottom flask fitted with a two neck adapter upon which were mounted a paddle stirrer and a 13 cm distillation column, distillation head, condenser and receiver. An amount of 4-acetoxybenzoic acid (188.6 g, 1.047 moles), terephthalic acid (26.58 g, 0.16 mole), 1,4-diacetoxybenzene (31.07 g, 0.16 mole) and 4-(4'-acetoxyphenoxy)benzoic acid (163.4 g, 0.60 mole) were added to the flask. The apparatus was evacuated and refilled with nitrogen. The flask was immersed in a molten salt bath preheated to 270° C. When the solid reactants had melted, stirring was started and the temperature was slowly increased to 320° C. over a 60 min period. In the next 30 minutes the pressure was reduced to 2 mm Hg and the temperature was increased to 340° C. The viscous, opaque, off-white reaction mass was stirred for an additional 50 minutes at 340° C. and 2 mm Hg then cooled to room temperature. The opaque, off-white copolyester plug was sawed into 0.5 cm slices then ground in a Wiley mill. The polyester had recurring structural units of

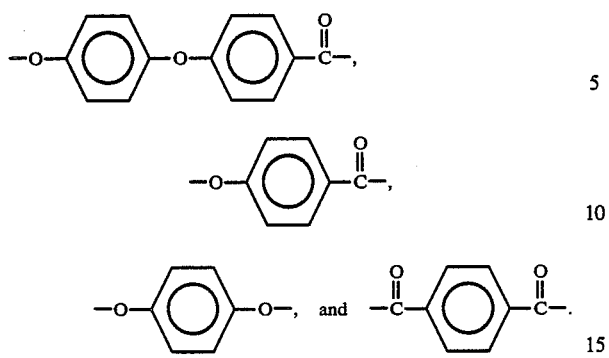

Physical and General Characteristics of a Copolyester of 4-Acetoxybenzoic Acid/Terephthalic Acid/1,4-Diacetoxybenzene/-4-(4'-Acetoxyphenoxy)-benzoic Acid The inherent viscosity of the copolyester prepared as described above was measured from a dilute solution (0.1 g per deciliter (dL)) in a mixture of 65 volume percent methylene chloride and 35 volume percent trifluoroacetic acid at 25 0° C. The viscosity was 2.03 dL g $^{-1}$.

Melt temperature analysis was carried out using differential scanning calorimetry (DSC) on a 15 mg compressed pellet at a heating and cooling rate of 20° C. min $^{-1}$ on a Mettler DSC-30 low temperature cell with a Mettler TC10A thermal analysis processor (Mettler Instrument Corp., Hightstown, N.J.). The copolyester showed peak melting points of 315° C. and 305° C. on the first and second scans of the DSC.

The copolyester was injection molded into standard ⅛ inch tensile test bars using a Boy* 30-M Injection Molding Machine (Boy Machines Inc., Exton, Pa.). The barrel temperature was held at 330° C., the mold temperature at 82° C. and the pressure at 15 bars. The table below lists the tensile and impact properties of these bars measured using procedures described in ASTM Test No's D638 and D256, respectively.

| PROPERTY | VALUE |
| --- | --- |
| Tensile Strength | 16,300 psi |
| Elongation | 3.97% |
| Tensile modulus | 7.45 × 10$^5$ psi |
| Notched Izod impact strength | 7.3 ft lb/in |

EXAMPLE II

Preparation of a Copolyester from 1,4-Diacetoxybenzene, Terephthalic Acid and 4-(4'-Acetoxyphenoxy)benzoic Acid Terephthalic acid (0.3603 g, 0.0020 mole), 4-(4'-acetoxyphenoxy)benzoic acid (1.3068 g, 0.0048 mole), and 1,4-diacetoxybenzene (0.3884 g, 0.0020 mole) were added to a 15 mm internal diameter polymerization tube which was equipped with a capillary tube and combined distillation head and condenser. The reaction vessel was alternately evacuated and purged with nitrogen and left under a mild flow of nitrogen. The reaction vessel was heated to 240° C. and after the monomers had melted, the capillary tube, with a slow nitrogen bleed, was inserted into the melt to facilitate mixing. The reaction temperature was maintained at 240° C. for 2 hours and gradually increased to 340° C. over the next 2 hours. While maintaining 340° C. a vacuum was applied of less than 3 mm Hg for one-half hour. The vacuum was then released under nitrogen and the reaction vessel was cooled to room temperature. The resulting copolyester was opaque and off-white in color. The copolyester had recurring structural units of

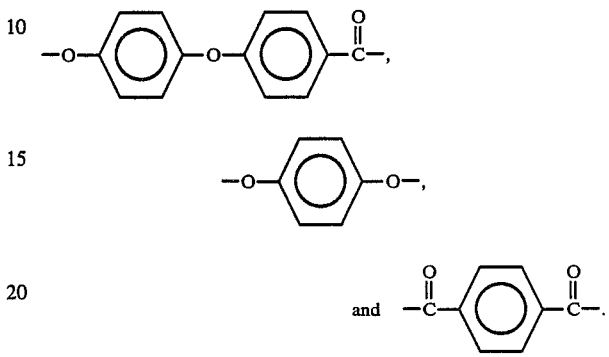

The DSC analysis of the copolyester showed two peak melting temperatures of 330° C. and 350° C. and a glass transition temperature of 155° C. on the first heating scan. The copolyester gave a crystallization peak at 210° C. on cooling and two peak melting temperatures of 312° C. and 330° C. on the second heating scan. The heating/cooling rate for each scan was 20° C. per minute.

Optical anisotropy of the copolyester melts can be determined by examination of the materials with the use of an optical microscope. The equipment used for determining the optical anisotropy of the copolyesters of the present invention included a TH 600 hot stage, (Linkham Scientific Instruments LTD, Surrey, England) and a Nikon Optiphot Microscope equipped with crossed polarizers and a 35 mm camera (Nikon Instrument Group, Nikon, Inc., Garden City, N.Y.). A film of the copolyester was optically anisotropic when observed through this polarizing microscope at 380° C.

What is claimed is:

1. A copolymer capable of forming an optically anisotropic melt comprising recurring structural units (a) independently selected from the group consisting of Formulas I, II, and mixtures thereof; recurring structural units (b) independently selected from the group consisting of Formulas III, V, and mixtures thereof; recurring structural units (c) independently selected from the group consisting of Formula IV; and optionally recurring structural units (d) independently selected from the group consisting of Formula VI:

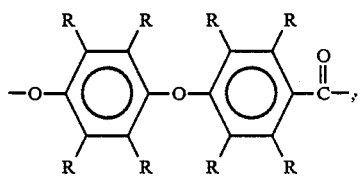

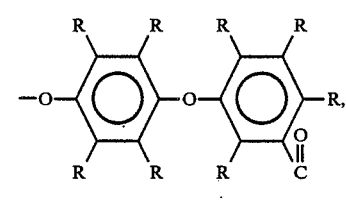

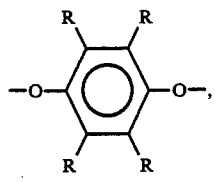
III

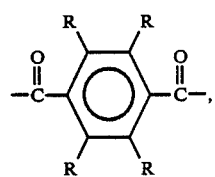
IV

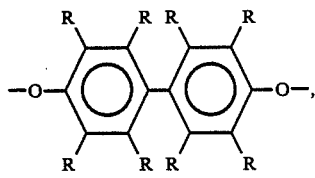
V

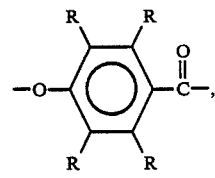
VI wherein each R is a chemically inert substituent.

2. The copolymer of claim 1 consisting essentially of the recurring structural units of Formulas I, III, IV and VI.

3. The copolymer of claim 1 consisting essentially of the recurring structural units of Formulas I, III and IV.

4. The copolymer of claim 1 wherein each R is independently selected from the group consisting of hydrogen, halo, lower alkyl, methoxy and phenyl.

5. The copolymer of claim 1 comprising from 10 to 75 mole percent of the independently occurring structural units of Formulas I and II, from 2 to 40 mole percent of the independently occurring structural units of Formulas III and V, from 2 to 40 mole percent of the independently occurring structural units of Formulas IV and from 0 to 80 mole percent of the recurring structural unit of Formula VI.

6. The copolymer of claim 1 comprising from 15 to 50 mole percent of the independently occurring structural units of Formulas I and II, from 5 to 35 mole percent of the independently occurring structural units of Formulas III and V, from 5 to 35 mole percent of the independently occurring structural units of Formulas IV and from 15 to 70 mole percent of the recurring structural unit of Formula VI.

7. The copolymer of claim 1 comprising from 15 to 35 mole percent of the independently occurring structural units of Formulas I and II, from 10 to 25 mole percent of the independently occurring structural units of Formulas III and V, from 10 to 25 mole percent of the independently occurring structural units of Formulas IV and from 35 to 65 mole percent of the recurring structural unit of Formula VI.

8. An anisotropic melt comprising at least one copolymer of claim 1.

9. An injection molded article of the melt of claim 8.

10. An oriented fiber of the melt of claim 8.

11. An extruded article of the melt of claim 8.

12. A film of the melt of claim 8.

* * * * *

UNITED STATES PATENT AND TRADEMARK OFFICE
CERTIFICATE OF CORRECTION

PATENT NO. : 4,946,926

DATED : August 6, 1990

INVENTOR(S) : William B. Marshall and James L. Brewbaker

It is certified that error appears in the above-identified patent and that said Letters Patent is hereby corrected as shown below:

Column 1, line 46, "Formulas III, IV," should read --Formulas III, V,--.

Column 5, line 63, "Preparation of 4-Aoetoxybenzoic" should read --Preparation of 4-Acetoxybenzoic--.

Column 7, line 20, "/-4-" should read --/4- --.

Signed and Sealed this

Twelfth Day of May, 1992

Attest:

DOUGLAS B. COMER

Attesting Officer     Acting Commissioner of Patents and Trademarks